United States Patent
Asif et al.

(10) Patent No.: US 12,126,828 B2
(45) Date of Patent: Oct. 22, 2024

(54) VIDEO ENCODING THROUGH NON-SALIENCY COMPRESSION FOR LIVE STREAMING OF HIGH DEFINITION VIDEOS IN LOW-BANDWIDTH TRANSMISSION

(71) Applicant: INTERNATIONAL BUSINESS MACHINES CORPORATION, Armonk, NY (US)

(72) Inventors: Umar Asif, Melbourne (AU); Lenin Mehedy, Doncaster East (AU); Jianbin Tang, Doncaster East (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/361,887

(22) Filed: Jul. 30, 2023

(65) Prior Publication Data
US 2024/0022759 A1 Jan. 18, 2024

Related U.S. Application Data

(63) Continuation of application No. 17/105,356, filed on Nov. 25, 2020, now Pat. No. 11,758,182.

(51) Int. Cl.
*H04N 19/54* (2014.01)
*G06N 20/00* (2019.01)
(Continued)

(52) U.S. Cl.
CPC ............. *H04N 19/54* (2014.11); *G06N 20/00* (2019.01); *G06V 10/462* (2022.01); *H04N 19/23* (2014.11); *H04N 21/23418* (2013.01)

(58) Field of Classification Search
CPC ........ H04N 19/23; H04N 19/30; H04N 19/54; H04N 19/597; H04N 21/23418;
(Continued)

(56) References Cited

U.S. PATENT DOCUMENTS 9,324,161 B2 4/2016 Zünd
10,163,227 B1 * 12/2018 Lester ............... G06F 18/24143
(Continued)

FOREIGN PATENT DOCUMENTS

CN 102726044 B 8/2016
CN 105959705 A 9/2016
(Continued)

OTHER PUBLICATIONS

Hadizadeh, H. et al., "Saliency-Aware Video Compression"; IEEE Transactions on Image Processing (2013); vol. 23 (1), 19-33.
(Continued)

*Primary Examiner* — Md N Haque
(74) *Attorney, Agent, or Firm* — Intelletek Law Group, PLLC; Gabriel Daniel, Esq.

(57) ABSTRACT

A computer-implemented method of decoding video data in multiple resolution formats includes receiving an encoded video stream including a salient data and a non-salient data, the salient data having a higher resolution format than the non-salient data. The video stream is decoded into the non-salient data in a lower-resolution format and the salient data in the higher-resolution format. The non-salient data is reconstructed to a higher resolution format. The salient data and the reconstructed non-salient data are combined to form a video stream in the higher-resolution format of the salient data.

9 Claims, 12 Drawing Sheets

(51) Int. Cl.
*G06V 10/46* (2022.01)
*H04N 19/23* (2014.01)
*H04N 21/234* (2011.01)

(58) Field of Classification Search
CPC ... H04N 21/234318; H04N 21/234327; H04N 21/251; H04N 21/4728; H04N 21/63; H04N 21/6587; H04N 21/816
See application file for complete search history.

(56) References Cited

U.S. PATENT DOCUMENTS

| | | | |
|---|---|---|---|
| 10,176,405 B1 | 1/2019 | Zhou | |
| 2005/0134791 A1 | 1/2005 | Xiao | |
| 2009/0284601 A1* | 11/2009 | Eledath | G06T 7/215 375/E7.076 |
| 2010/0067863 A1* | 3/2010 | Wang | G11B 27/034 386/279 |
| 2011/0142370 A1* | 6/2011 | Joshi | H04N 23/683 382/307 |
| 2012/0300048 A1* | 11/2012 | Carson | H04N 23/80 348/61 |
| 2013/0223683 A1 | 8/2013 | Jiang | |
| 2014/0016858 A1 | 1/2014 | Richert | |
| 2014/0177706 A1 | 6/2014 | Fernandes | |
| 2014/0270553 A1 | 9/2014 | Zund | |
| 2015/0271356 A1 | 9/2015 | Terada | |
| 2015/0375117 A1* | 12/2015 | Thompson | A63F 13/79 463/9 |
| 2020/0074589 A1 | 3/2020 | Stent | |
| 2021/0006730 A1* | 1/2021 | Solomon | G06F 1/166 |

FOREIGN PATENT DOCUMENTS

| | | | | |
|---|---|---|---|---|
| CN | 106791927 A | 5/2017 | | |
| CN | 107194927 A | 9/2017 | | |
| CN | 107423740 A | * 12/2017 | ........... | G06K 9/4671 |
| EP | 1936566 A1 | 6/2008 | | |
| EP | 3353745 A1 | 8/2018 | | |
| JP | 5319875 B2 | 10/2013 | | |
| WO | 2014008541 A1 | 1/2014 | | |
| WO | 2017055609 A1 | 4/2017 | | |
| WO | 2017/144881 A1 | 8/2017 | | |

OTHER PUBLICATIONS

Lyudvichenko, V., et al., "Improving Video Compression With Deep Visual-Attention Models"; International Conference on Intelligent Medicine and Image Processing (2019); pp. 88-94.

Mazumdar, A. et al., "Perceptual Compression for Video Storage and Processing Systems"; In Proceedings of the ACM Symposium on Cloud Computing (2019); pp. 179-192.

Mell, P. et al., "Recommendations of the National Institute of Standards and Technology"; NIST Special Publication 800-145 (2011); 7 pgs.

Polakovic, R. et al., "An Approach to Video Compression Using Saliency Based Foveation"; In Proceedings of the ACM Symposium on Cloud Computing (2018); pp. 179-192.

Zund, F. et al., "Content-Aware Compression Using Saliency-Driven Image Retargeting"; IEEE International Conference on Image Processing (2013); pp. 1845-1849.

List of IBM Patents or Patent Applications Treated as Related, Jul. 30, 2023, 2 pgs.

* cited by examiner

VIDEO ENCODING THROUGH NON-SALIENCY COMPRESSION FOR LIVE STREAMING OF HIGH DEFINITION VIDEOS IN LOW-BANDWIDTH TRANSMISSION

BACKGROUND

Technical Field

The present disclosure generally relates to video compression, and more particularly, to the techniques for video enhancement in low-bandwidth transmission applications.

Description of the Related Art

There has been an explosive increase in the amount of high-resolution video data on the Internet, particularly with the reduced costs of more powerful devices and the growth of applications to create, view, and transmit content. It is estimated that the number of people transmitting high-resolution video data, which exceeds 100 million people, involves large bandwidth costs. In particular, as ever-increasing numbers of users concurrently view live events, the bandwidth costs to provide good service to so many users continues to increase.

Currently, efficient video codec based decoding techniques have been created in an attempt to reduce bandwidth costs. For example, video coding/decoding techniques such as H.264 can effectively compress video size for videos having a significant amount of temporal redundancy. However, there are problems with such types of video coding/decoding techniques, with lost information occurring during the compression-decompression processes that reduces the quality of the video. Another issue with such types of video coding/decoding techniques is their computational complexity. Powerful hardware is involved to implement such video coding/decoding techniques, which poses a problem regarding implementation on devices such as mobile phones.

Some attempts at addressing the bandwidth cost problem include adaptive video compression of a graphic user interface using the application metadata. A structural portion or semantic portion of a video signal is the object of an adaptive coding unit of an identified image region. This protocol still requires user end devices capable of performing complex decompression and smoothing in accordance with the analysis of the application metadata.

Other attempts include data pruning for video compression using example-based super-resolution. Patches of video are extracted from an input video, grouped in a clustering method, and representative patches are packed into patch frames. The original video is downsized and sent along with, or in addition to, patch frames. At the decoding end, regular video frames are upsized and the low-resolution patches are replaced by patches from a patch library. Replacement is only made if there is an appropriate patch available.

There also have been attempts to use artificial intelligence (AI) to address problems in video enhancement and transmission. For example, down sampling has been carried out in high-definition video at a video source end to obtain a low-definition video. The low-definition video is compressed in an existing video coding mode and transmitted, greatly reducing the video traffic. At a receiving end, the user receives and reconstructs the low-definition video by applying deep learning to a super-resolution image reconstruction method to restore the low-definition video into a high-resolution video at a 50% reduction in video transmission bandwidth cost. Thus, compression and reconstruction on an entire video is performed without a knowledge of salient and non-salient information.

There remains a need to develop video compression/encoding and enhancement techniques in low-bandwidth transmission applications.

SUMMARY

According to one embodiment, a computer-implemented method of encoding video streams for low-bandwidth transmissions, the method includes identifying a salient data and a non-salient data in a high-resolution video stream. The salient data and the non-salient data are segmented, and the non-salient data is compressed to a lower resolution. The salient data and the compressed non-salient data are transmitted in a low-bandwidth transmission. The computer-implemented method advantageously permits the transmission of high-resolution data in a low-bandwidth transmission with a less complicated process that compresses the non-salient data.

In one embodiment, the computer-implemented method further includes encoding the non-salient data prior to performing the compressing of the non-salient data. The encoding puts the data in a format suitable for transmission in the low-bandwidth.

In one embodiment, the computer-implemented method further includes the salient data at a lower compression ratio than the non-salient data prior to transmitting the salient data and the compressed non-salient data. The salient data is often the data most closely watched, and if not transmitted in its high-resolution form because of bandwidth issues, a compression that is less than the non-salient data can facilitate reconstruction at the receiving end.

In one embodiment, the computer-implemented method further includes identifying at least one of the non-salient data and the salient in the video stream by a machine learning model. The use of the machine learning model brings increased efficiency and identifying of salient data and non-salient data using domain knowledge.

In one embodiment, the machine learning model is a General Adversarial Network (GAN), and the computer-implemented method further includes training the GAN machine learning model to perform identifying the non-salient data with data of non-salient features from previously recorded video streams. The GAN machine learning model is particularly effective in performing accurate identification of the salient and non-salient data.

In one embodiment, the computer-implemented method further includes providing the GAN machine learning model to a user device prior to transmitting the salient data and the compressed non-salient data of the video stream to the user device. The user receives access to the GAN model to have an advantage in reconstructing the lower-resolution non-salient data to high-resolution non-salient data and for combining with the salient data to reconstruct the high-resolution video.

In one embodiment, the identifying of the salient data includes identifying domain-specific characteristics of objects in the video stream. The characteristics of certain objects can increase the speed and accuracy of identifying salient data.

In one embodiment, the identifying of the salient data includes applying a domain-specific Artificial Intelligence (AI) model for one or more of facial recognition or object recognition. The AI model for facial recognition increases the efficiency and speed of the identification operation of the salient and non-salient data.

In one embodiment, the applying of the domain-specific AI model includes identifying a remainder of the information of the video stream as the non-salient data.

In one embodiment, a plurality of video streams are received having respectively different views of one or more objects, and the identifying and segmenting of the salient data and non-salient data is performed individually for at least two respectively different views that are transmitted. The different camera views bring greater flexibility to user views, and performing an individual identifying and segmenting of the video data increases efficiency and the selection of a particular view.

In an embodiment, a computer-implemented method of decoding video data in multiple resolution formats includes receiving a video stream having salient data and non-salient data. The salient data is in a higher resolution format than the non-salient data. Reconstructing is performed on the non-salient data to increase the resolution format. The salient data and the reconstructed non-salient data are recombined to form a video stream in the higher-resolution format of the salient data. The decoding permits the received compressed non-salient data to have its resolution increased to be combined with the salient data in a high-resolution video.

In one embodiment, the computer-implemented method further includes receiving one or more of a link to access or executable code for loading a Generative Adversarial Network (GAN) machine learning model trained to identify non-salient features based on previously recorded video streams. The non-salient data is reconstructed at an increased resolution using the GAN machine learning model, and the GAN machine model has increased efficiencies at reconstructing the video into a high-definition resolution.

In one embodiment, the received video stream includes salient data and non-salient data captured from multiple viewpoints, and the GAN machine learning model is trained to identify the salient data based on the multiple viewpoints. The non-salient data is reconstructed to the higher resolution of the salient data using the GAN machine learning model trained on the multiple viewpoints. There are advantages in being able to have multiple viewpoints, particularly in sporting events, and the GAN machine learning increases the efficiency of distinguishing between the salient and non-salient data.

In one embodiment, the computer-implemented method further includes receiving multiple transmissions of the salient data and the non-salient data for each respective viewpoint, reconstructing a particular viewpoint for display in response to a selection. The selectability of different viewpoints makes for an increased usefulness of data viewing.

In one embodiment, the computer-implemented method further includes sharing location information with one or more registered users; and receiving selectable views of the salient data and the non-salient data captured by the one or more registered users. The users advantageously can share views amongst themselves from different positions in an arena, theater, etc.

In an embodiment, a computing device for encoding video streams for low-bandwidth transmissions includes a processor; a memory coupled to the processor, the memory storing instructions to cause the processor to perform acts including identifying a salient data and a non-salient data in a video stream, and segmenting the video stream into salient data and the non-salient data. The non-salient data is encoding and compressed, and the salient data and the compressed non-salient data is transmitted. The computer device advantageously permits the transmission of high-resolution data in a low-bandwidth transmission with a less complicated operation to compress the non-salient data. There can be savings in processing power and required bandwidth for transmission.

In one embodiment, the computing device includes a General Adversarial Network (GAN) machine learning model in communication with the memory, and the instructions cause the processor to perform additional acts including training the GAN machine learning model with training data of non-salient features based on previously recorded video streams to perform the identifying of at least the non-salient data. The GAN machine learning model makes for a more efficient operation with reduced processing and power requirements.

In one embodiment, the computing device causes the processor to perform additional acts including the identifying of the salient data includes applying a domain-specific Artificial Intelligence (AI) model for one or more of facial recognition or object recognition. The use of AI in facial or object recognition provides for increased accuracy and efficiency in identifying the salient and non-salient data.

In one embodiment, the computing device includes additional instructions to cause the processor to perform additional acts including transmitting different camera views of the salient data and the non-salient data to respective recipient devices. The different camera views increase the effectiveness of any associated user device by providing the different views of an event being captured.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high-level, without detail, to avoid unnecessarily obscuring aspects of the present teachings.

In the present disclosure, the term a "Low bandwidth" corresponds to wireless communication at about 2 kbps (e.g., 1G). A "High bandwidth range" corresponds to wired/wireless communications up to 1 Gbps or higher (e.g., Ethernet or 5G). References herein to video resolutions correspond to QVGA (240×320-pixels) for low resolution, and 4K (3840×2160-pixels) for high resolution.

The computer-implemented method and device of the present disclosure provide for an improvement in the fields of image processing and video transmission, in particular by transmitting the salient data portion of a high definition video data over a low bandwidth transmission without compressing the salient data and without resulting in a loss in quality at a user end. By compressing the non-salient data and leaving the salient data for transmission in its high-definition form, the efficiency and quality of the video data are increased. The system and method of the present disclosure are less complicated, which results in reduced power usage and reduced processing capability required as compared with compressing entire video streams for transmission. The video quality will not suffer from a loss in the way a conventional compression of the entire video stream would suffer. There is also realized a time savings using the teachings of the present disclosure, as less data is compressed and decompressed.

For example, in certain illustrative embodiments of the present disclosure, the domain-specific information (e.g. salient information) is highly relevant for the end user and is therefore kept in its original resolution. The other information from the video is compressed, transmitted and reconstructed at the user end. The present disclosure is an improvement over methods which extract patches without domain knowledge and uses these patches to up-sample the video.

Example Architecture

Figure 1:
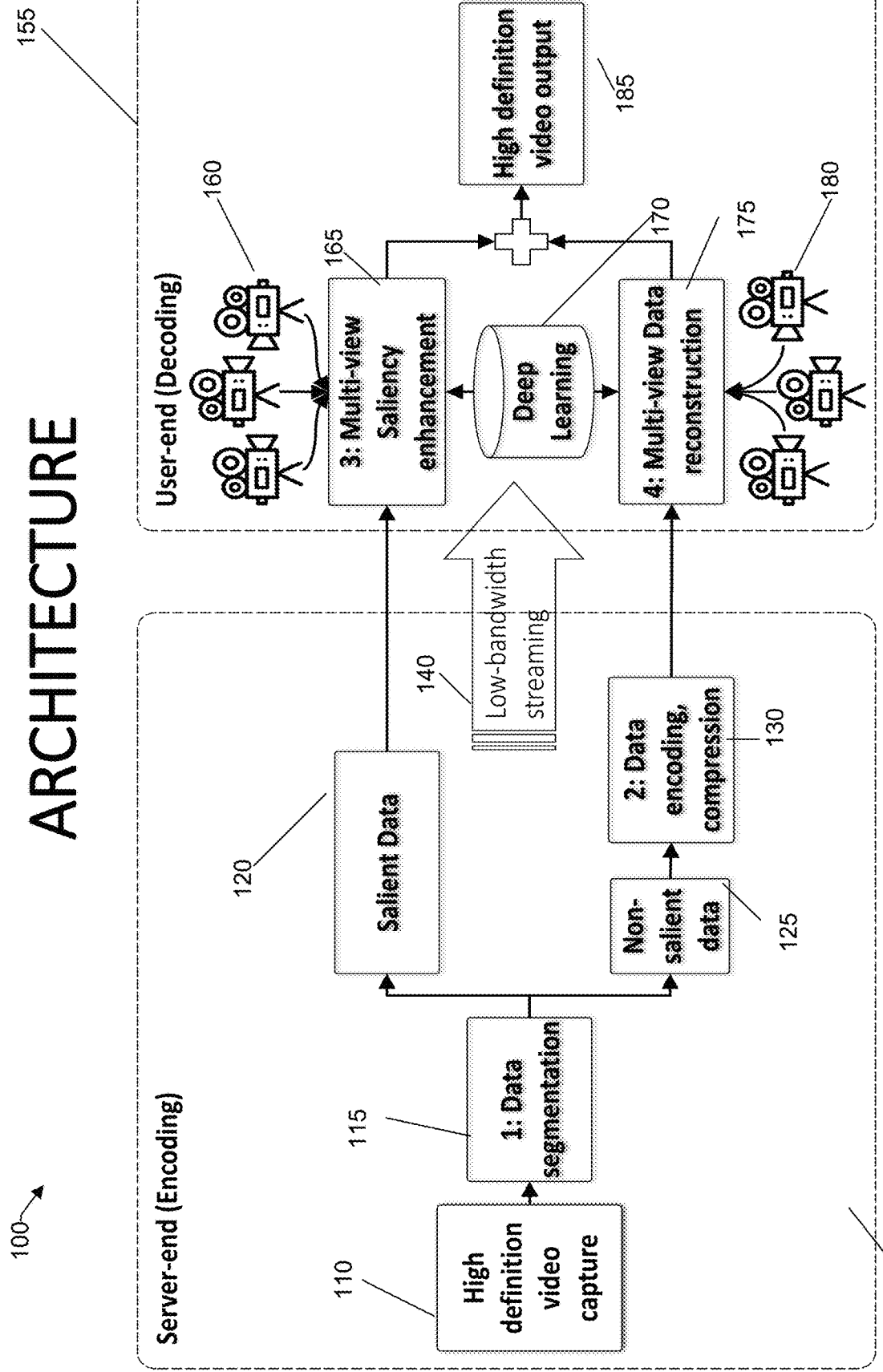
FIG. 1 provides an architectural overview of a system for encoding video streams for low-bandwidth transmissions, consistent with an illustrative embodiment.

FIG. 1 provides an architectural overview 100 of a system for encoding video streams for low-bandwidth transmissions, consistent with an illustrative embodiment.

FIG. 1 shows a server end 105 that encodes the high definition data for low bandwidth transmission according to the present disclosure. The high definition video capture 110 is typically a camera, but if the event were previously recorded, the captured video could be provided by a storage device or a video player. At 115 data segmentation takes place to segment the data into salient data 120 and non-salient data 125. Salient data can include domain-relevant data, such as objects of interest, or user marked regions of interest. Salient data may also be objects in motion. For example, in a soccer match, the players and the ball would at least be considered salient data, whereas the crowd and the arena would be considered non-salient data. Non-Salient data is data with little significance, such as, without limitation, static information in video frames, crowd scenes, backgrounds, etc. An encoder 130 is configured to perform encoding and compression on the non-salient data.

Figure 2:
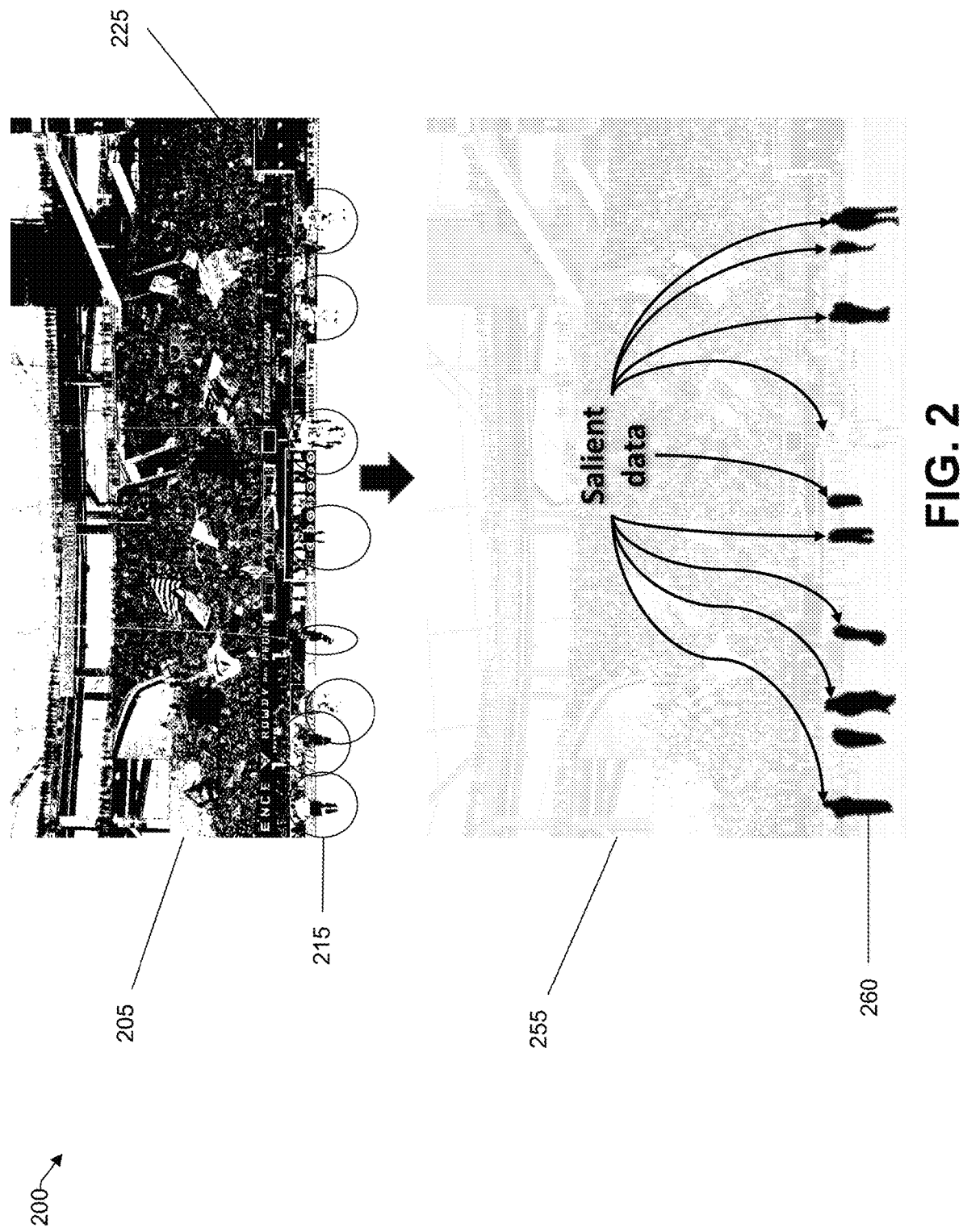
FIG. 2 illustrates a data segmentation operation of the video of a first sporting event in which salient data is identified, consistent with an illustrative embodiment.
Figure 3:
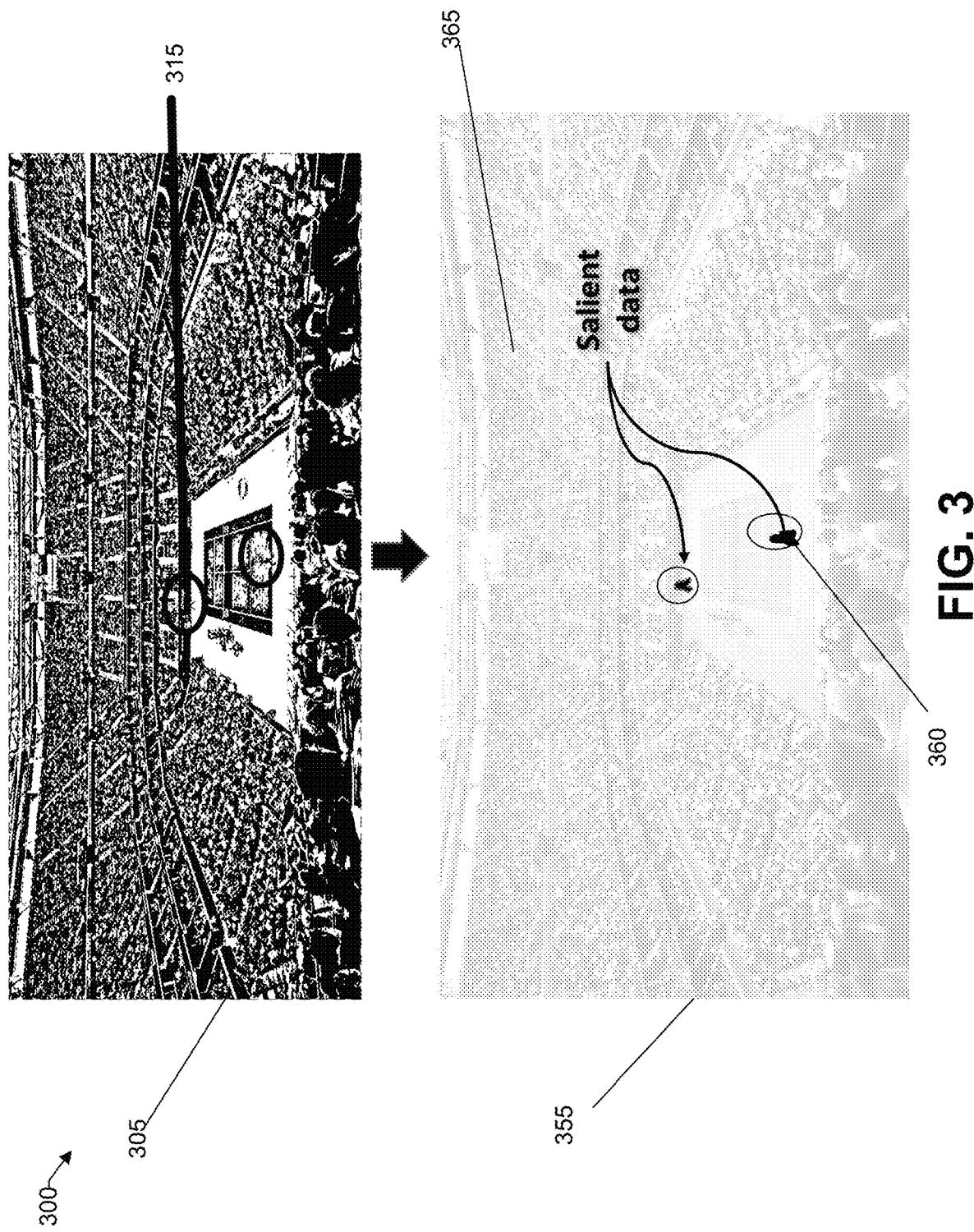
FIG. 3 illustrates a data segmentation operation of the video of a second sporting event in which salient data is identified, consistent with an illustrative embodiment.

The result is that the encoded and compressed non-salient data is now low-resolution non-salient data, particularly due to the compression process. However, the salient data in this illustrative embodiment remains in the form of high-resolution salient data. Thus, the salient data does not suffer from compression losses that can occur when data is compressed, and the perceived quality of the video will remain high, as viewers typically watch the salient data and often do not focus on the background data. By compressing the non-salient data, the reduction is sufficient to transmit the video using low-bandwidth streaming. Moreover, as the non-salient data often tends to occupy a large majority of the viewing area (as shown in FIGS. 2 and 3), the server encoding and compression of the present disclosure, such as shown in FIG. 1, provides an efficient way to transmit high definition video by low-bandwidth streaming. The server end encoding and compression as discussed herein above does not require the large computational resources that are required of conventional compression of high definition video.

Still referring to FIG. 1, the user end 155 receives the low-bandwidth transmission 140 and performs decoding and reconstruction. In a single view transmission captured with a single camera 160, the user end device will decode the video stream into the non-salient data in a lower-resolution format and the salient data in the higher resolution format (presuming the salient data was encoded for transmission but not compressed). The non-salient data is reconstructed to the higher resolution format of the salient data. The salient data and the reconstructed non-salient data are combined to form a video stream 185 in the higher-resolution format of the salient data that is output.

In certain illustrative embodiments, Artificial intelligence (AI) has a role at the server-end and/or at the user end. At the server end, a machine learning model is trained to identify salient data and non-salient data (e.g., data segmentation). The machine learning model can be trained with previously recorded videos/images of non-salient information. For example, in the event that a soccer match is being streamed, previously recording of the crowd, the arena, the field, etc., can be used to train the machine learning model as to which captured video data is non-salient data, as well as training the machine learning model to identify the salient data. One way to detect salient data is by detecting movement. For example, at a soccer match the players, the soccer ball and the referees are usually in motion.

The salient data corresponds to domain-specific characteristics (e.g., players in a soccer match), which can be provided to the system through a user interface (e.g., highlights/annotations on the video), or it can be detected automatically through domain-specific AI-models for facial/object recognition. The remaining information in the video is regarded as non-salient or background. Particularly at the server end, a machine learning model of a General Adversarial Network (GAN) is trained to detect non-salient features (e.g., a crowd in the arena).

With further regard to the user-end 155, in an illustrative embodiment, when a user registers with the system, the system sends the trained model (GAN) to the user so that, subsequently, the non-salient features can be reconstructed. Another way the user may access the GAN is through a link, as the user-end 155 may not have the storage space or processing power to receive and operate the GAN.

With continued reference to FIG. 1, it is shown that multiple cameras 160 can be used for multi-view saliency enhancement 165 in conjunction with a deep learning 170 process. The multi-view saliency enhances 165 occur by combining salient information of the multiple viewpoints and training an AI model (deep learning model 170) to improve the image quality of the salient data. In addition, the data collected from multiple viewpoints from the cameras 180 can also be combined together to train the deep learning model 170 to improve the reconstruction of the image from low resolution to high resolution.

FIG. 2 illustrates a data segmentation operation 200 of the video of a first sporting event in which salient data is identified, consistent with an illustrative embodiment. FIG. 2 shows an image 205 of a soccer match with the players 215 circled for ease of understanding. In this instance, the players are the salient data, and the background crowd 225 and the arena (as well as all the flags and signs) are non-salient data. As shown in the washout image 255, the salient data 260 is identified for data segmentation. In accordance with the description in FIG. 1, the salient data is extracted for transmission in its high definition format, whereas the background data is subject to encoding and compression. The salient and non-salient data is transmitted to one or more user devices via low-bandwidth transmission. Here it can be seen that the non-salient data 225 I the vast majority of the image as compared to the players 215 (the salient data), so the encoding and compression of the non-salient data will result in a significant reduction of the data size of the image.

Figure 4A:
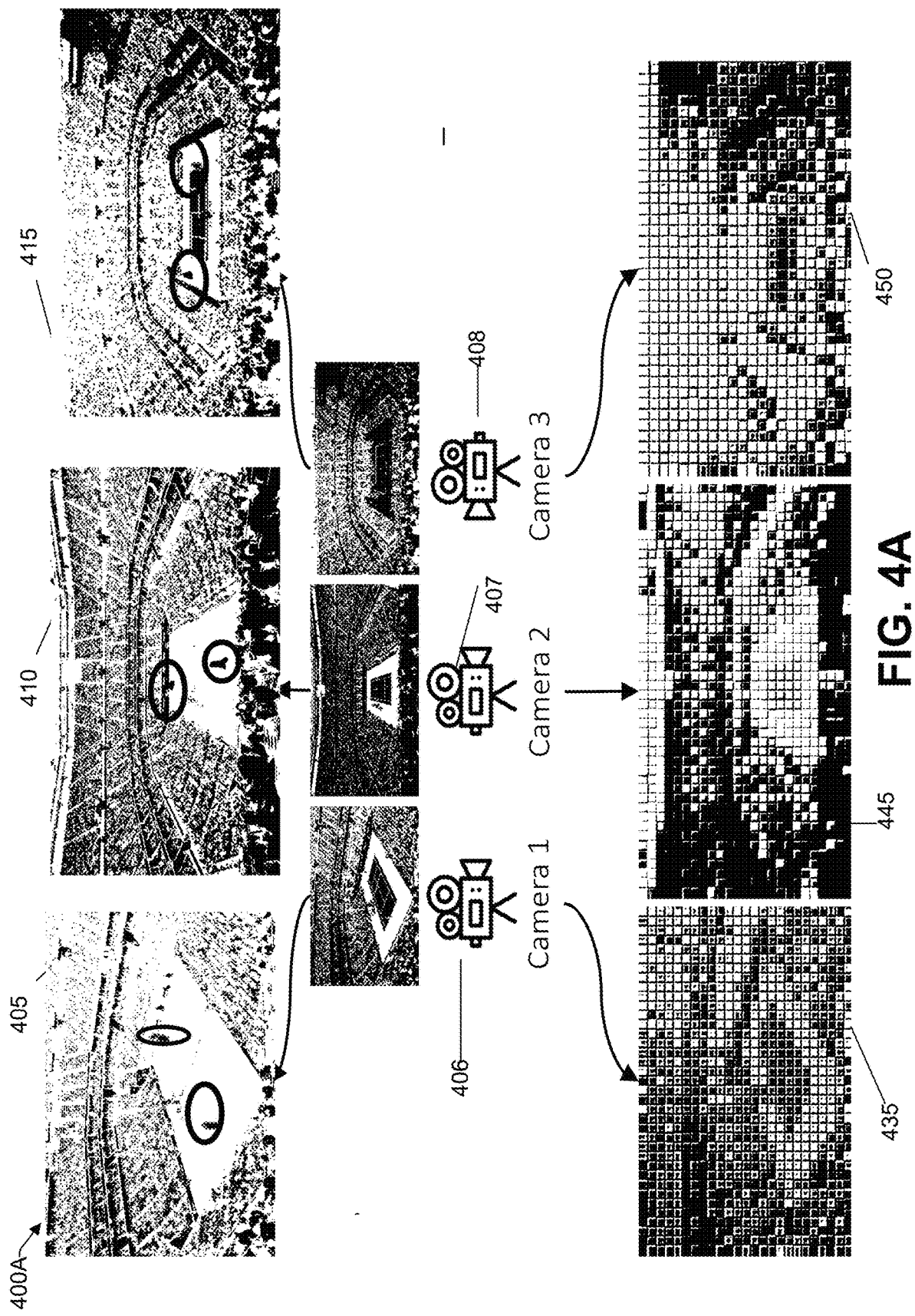
FIG. 4A illustrates an operation of detecting salient data from multiple viewpoints, consistent with an illustrative embodiment.

FIG. 3 illustrates a data segmentation operation 300 of the video of a second sporting event in which salient data is identified, consistent with an illustrative embodiment. FIG. 3 shows in 305 a tennis match with the two players 315 circled. In the washout view 355, the two players are the salient data extracted for transmission with a change in formatting, whereas the remainder of the image is non-salient data 365. The non-salient data is encoded and compression for transmission in a low-transmission bandwidth, FIG. 4A illustrates an operation of detecting salient data from multiple viewpoints 400A, consistent with an illustrative embodiment. It is shown that there are three viewpoints, the first viewpoint 405, the second viewpoint 410, and the third viewpoint 415. The first viewpoint 405 appears at about a 45-degree angle relative to the second viewpoint 410, and the third viewpoint 415 appears at about a 90-degree angle relative to the second viewpoint 410. Respective cameras 406, 407, 408 each captured a viewpoint 405, 410, 415. The salient data for each viewpoint is circled. Below in 435, 445, and 450 is the non-salient data that is compressed.

Figure 4B:
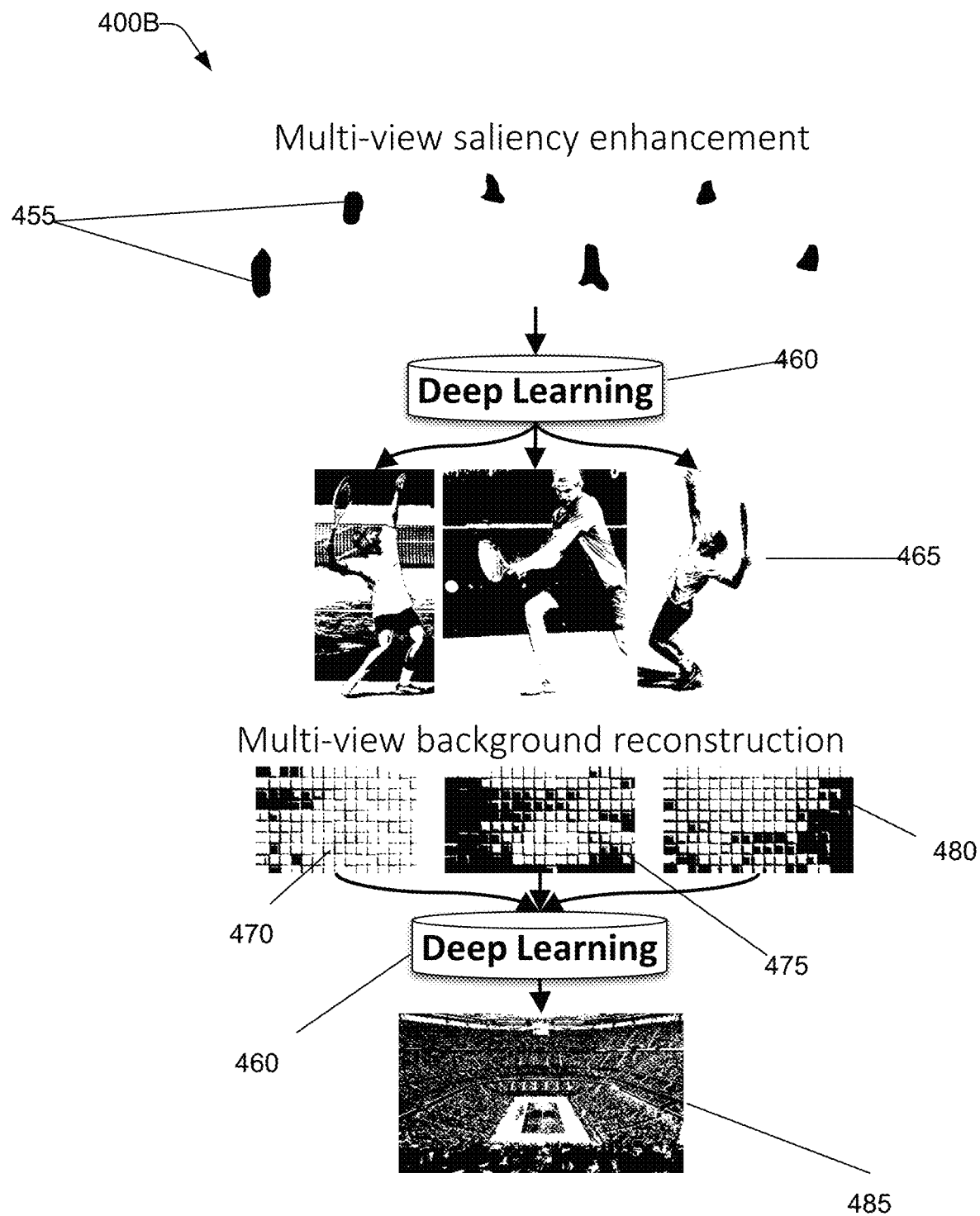
FIG. 4B illustrates the decoding and reconstruction of the multiple viewpoints of salient data detected in FIG. 4A, consistent with an illustrative embodiment.

FIG. 4B illustrates the user end decoding and reconstruction 400B of the multiple viewpoints of salient data detected in FIG. 4A, consistent with an illustrative embodiment. the salient points 455 are shown in FIG. 4B. It can be seen that the amount of salient data 455 (six objects in the example of FIG. 4B) is the same as shown in FIG. 4A. The multi-view saliency enhancement occurs by training an AI model (e.g., deep learning 460) with the salient data, and it is shown that different views 465 of the object are output. FIG. 4B also shows how the deep learning 460 is used for multi-view background reconstruction. Views 470, 475, 480 are input to the deep learning 460, and a resultant image 485 based on the reconstruction is shown.

Figure 5:
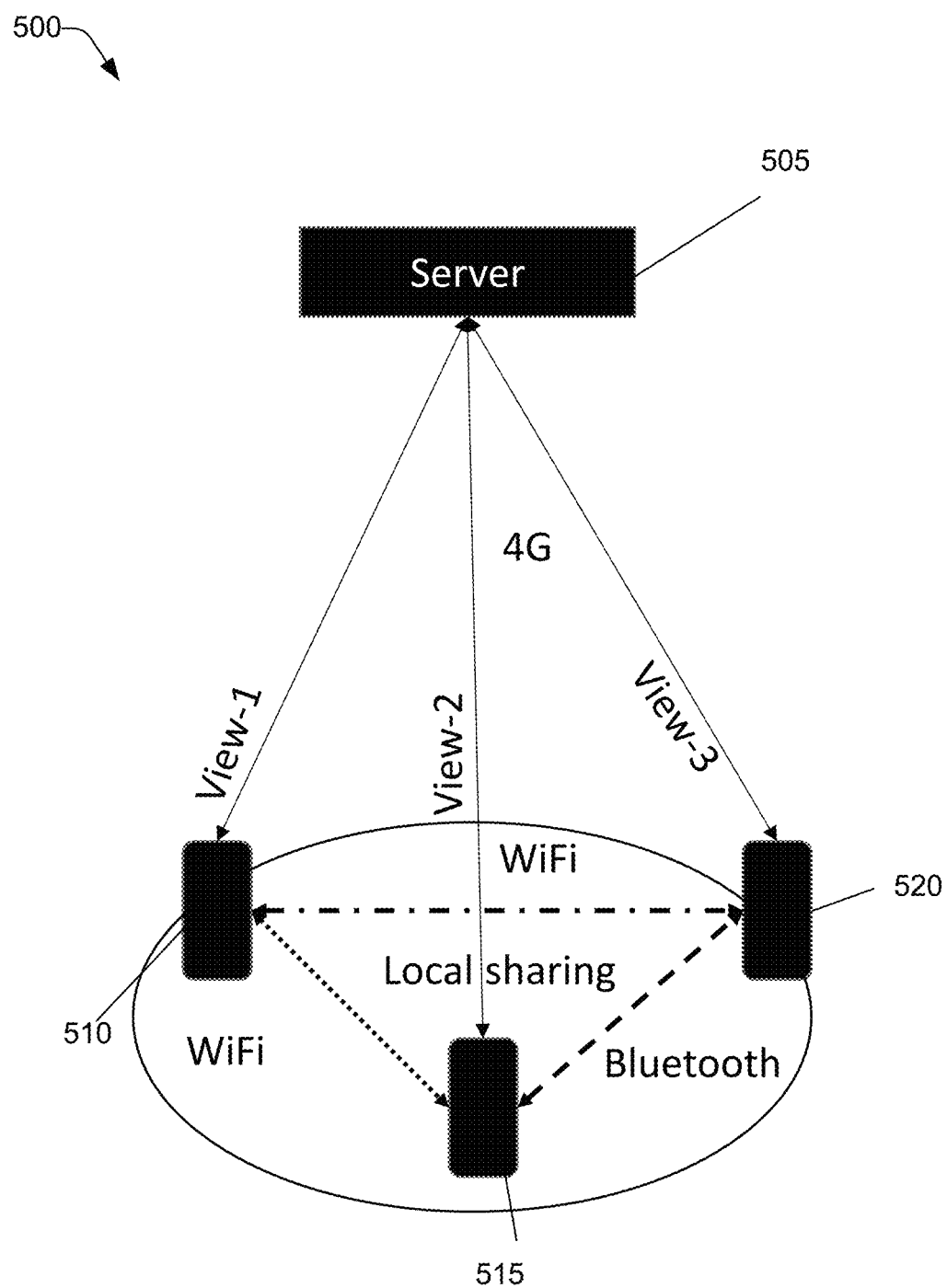
FIG. 5 illustrates user end decoding that includes multi-view saliency enhancement, consistent with an illustrative embodiment.

FIG. 5 illustrates user end decoding that includes multi-view saliency enhancement, consistent with an illustrative embodiment. FIG. 5 is an illustrative embodiment that is configured for multiple camera view transmission and sharing. There is shown a server 505 and three user end devices 510, 515, and 520. It is to be understood that the number of user end devices 510, 515, 520 can be more or less than shown. The user end devices may be at different locations during the same event. Each of the user end devices 510, 515, 520 can communicate with the server 505, as well as each other. In this illustrative embodiment, the user end devices 510, 515, 520 can use WiFi or Bluetooth to communicate with each other, and cellular (4G) to communicate with the server 505. In FIG. 5, the server 505 sends one or more views to each user, and the user end devices share multiple views locally to improve the reconstruction of the video. Data collected from multiple camera viewpoints can be combined to train an AI model to improve the reconstruction of a non-salient image from low resolution to high resolution. Also, a salient image can have its quality improved by combining salient information from different camera viewpoints and training an AI model to improve the image quality of the salient data.

The user end device 510, 515, and 520 can discover each other and establish a channel available in a high bandwidth network through negotiation (e.g., WiFi, Bluetooth). In addition, the user end devices can display any view, e.g., a user in geographic proximity of one location can choose any camera of the other users end devices and enjoy any desired view. The server may dynamically create user groups based on user's mobility and network bandwidth availability.

Example Process

With the foregoing overview of the example architecture, it may be helpful now to consider a high-level discussion of an example process. To that end, in conjunction with FIGS. 1-5, FIGS. 6, 7, and 8 depict flowcharts 600, 700, and 800, illustrating various aspects of a computer-implemented method, consistent with an illustrative embodiment. Processes 600, 700, and 800 are each illustrated as a collection of blocks, in a logical order, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

Figure 6:
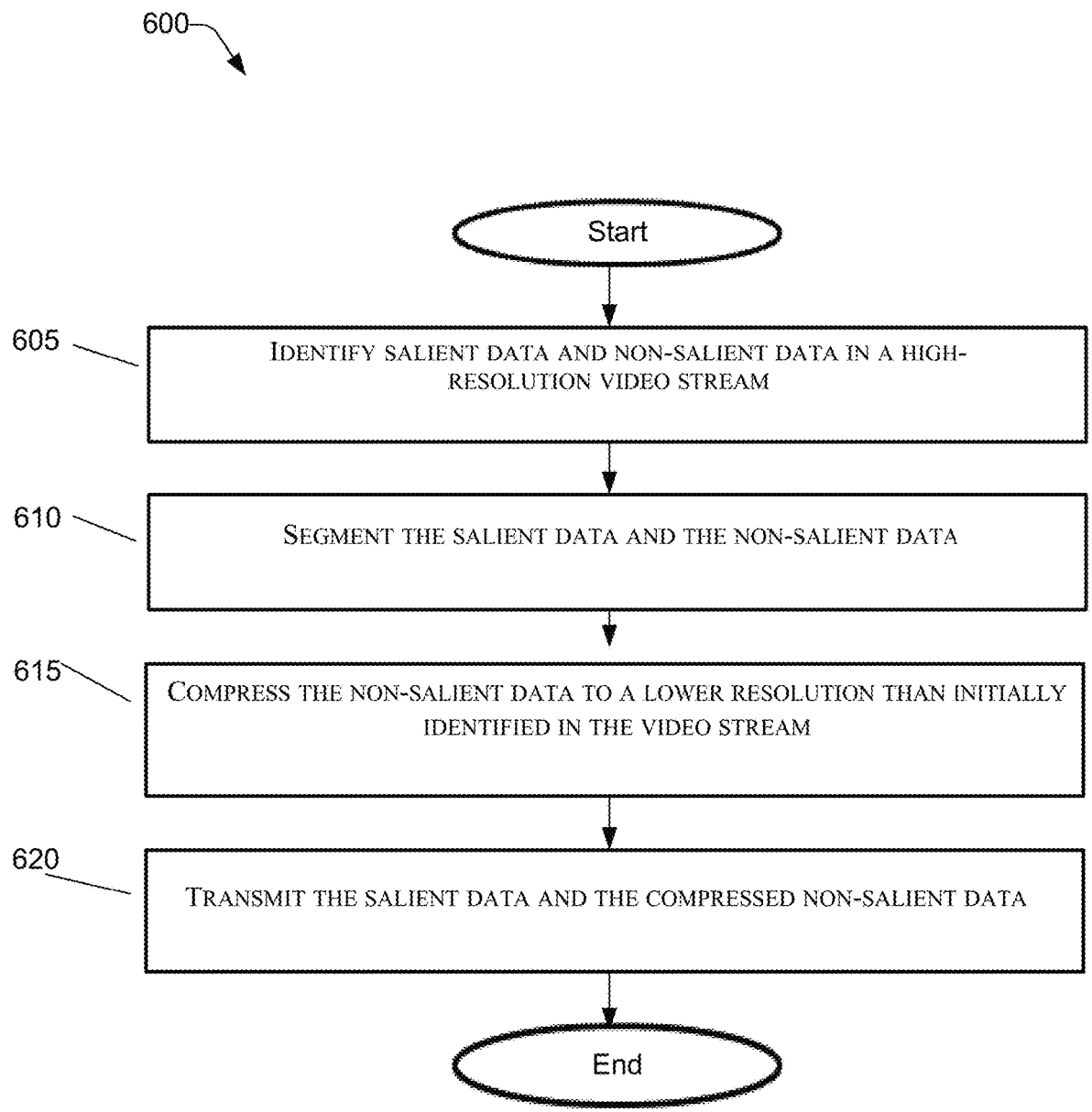
FIG. 6 is a flowchart illustrating a computer-implemented method of encoding video streams for low-bandwidth transmissions, consistent with an illustrated embodiment.

FIG. 6 is a flowchart 600 illustrating a computer-implemented method of encoding video streams for low-bandwidth transmissions, consistent with an illustrated embodiment. At operation 605, salient data is identified in a high-resolution video stream. As shown in FIGS. 1, 2, and 3, the high-resolution video includes but is not limited to a sporting event, musical event, etc.

At operation 610, data segmenting of the salient data and the non-salient data is performed. An AI model can be used to identify the objects in the image that constitute salient data. By way of non-limiting example, the salient data could be people, places, objects, etc., as discussed with regard to FIGS. 2 and 3.

At operation 615, the non-salient data is encoded and compressed to a lower resolution than in the captured high-resolution video. The salient data is not compressed and may be encoded. In extremely low bandwidth scenarios (e.g., remote video surveillance of people or vehicles using wireless communications at bandwidths of about 2 kbps or less), the salient data could also compressed, but at a lower rate of compression than the non-salient data. The compression can affect the image quality, which is why in this illustrative embodiment the non-salient data is compressed while the salient data is not compressed.

At 620, the compressed non-salient data and the salient data are transmitted to a user device. FIG. 1 provides an overview of an example server end process as well.

Figure 7:
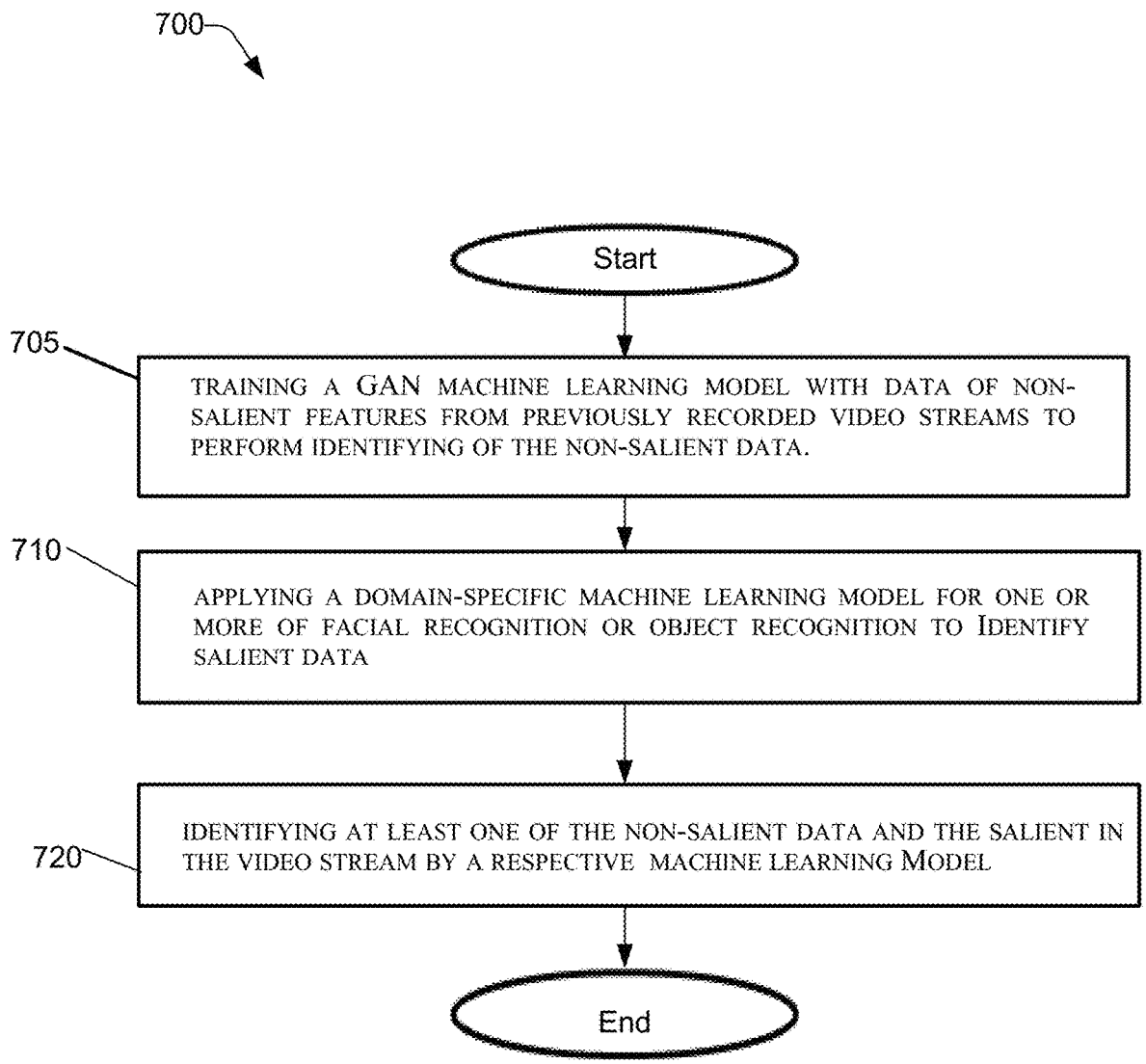
FIG. 7 is a flowchart illustrating the use of machine learning models for a computer-implemented method of encoding video streams for high-definition video in a low-bandwidth transmission, consistent with an illustrated embodiment.

FIG. 7 is a flowchart illustrating the use of machine learning models for a computer-implemented method of encoding video streams for high-definition video in a low-bandwidth transmission, consistent with an illustrated embodiment.

At operation 705, a General Adversarial Network (GAN) machine learning model is trained with data of non-salient features previously recorded to assist in the identification of the non-salient information. The non-salient information may include background information, and/or static information.

At operation 710, a domain-specific machine learning model for one or more of facial recognition or object recognition is applied to the video data to identify salient data. The facial recognition can be used, for example, to identify tennis players in a tennis match. The object recognition can be the tennis rackets and a tennis ball.

At operation 720, one of the non-salient data and the salient data in the video stream are identified by operation of a respective machine learning model. The non-salient data can be encoded and compressed, and the salient data made ready for transmission.

Figure 8:
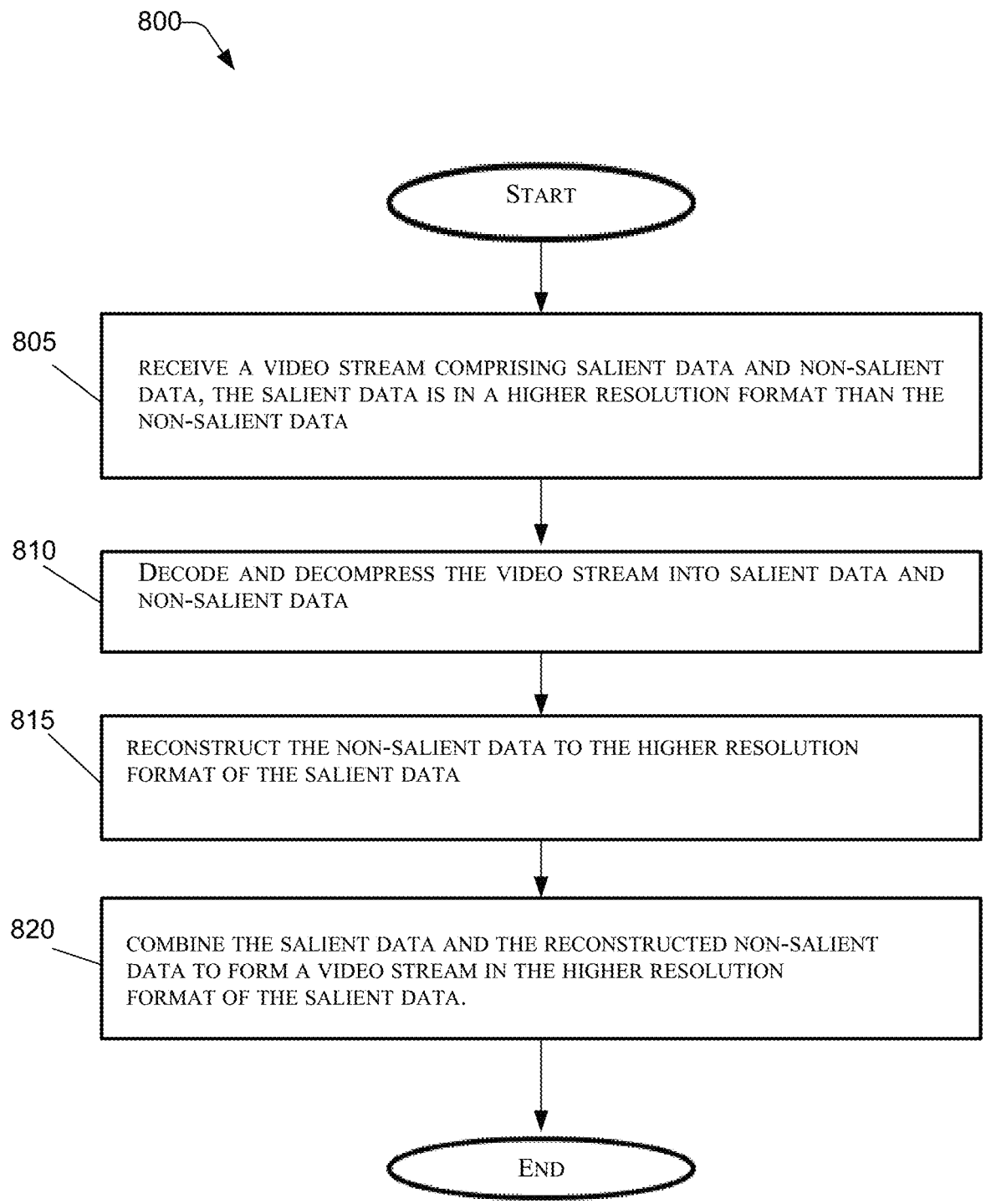
FIG. 8 is a flowchart illustrating operations for decoding and reconstruction, consistent with an illustrative embodiment.

FIG. 8 is a flowchart illustrating operations for decoding and reconstruction, consistent with an illustrative embodiment.

At operation 805, a user device (see FIG. 1) receives a video data stream containing salient data in a high-resolution format, and non-salient data in a low-resolution format.

At operation 810, the video stream is decoded and decompressed, and the video data is segmented into non-salient data and salient data. An AI model, such as a GAN model, or deep learning may be used to identify and segment the data.

At operation 815, the non-salient data is reconstructed to the higher resolution format of the salient data. Again, the user end device may use deep learning or a GAN to assist in this process. There may or may not be multiple camera views that can be used by the deep learning model to assist in the reconstruction.

At operation 820, the salient data and the reconstructed non-salient data are recombined to form a video stream in the higher-resolution format of the salient data. Thus, the high definition salient video data can be received by the user end using a low bandwidth without being compressed because the non-salient information is encoded and compressed.

Figure 9:
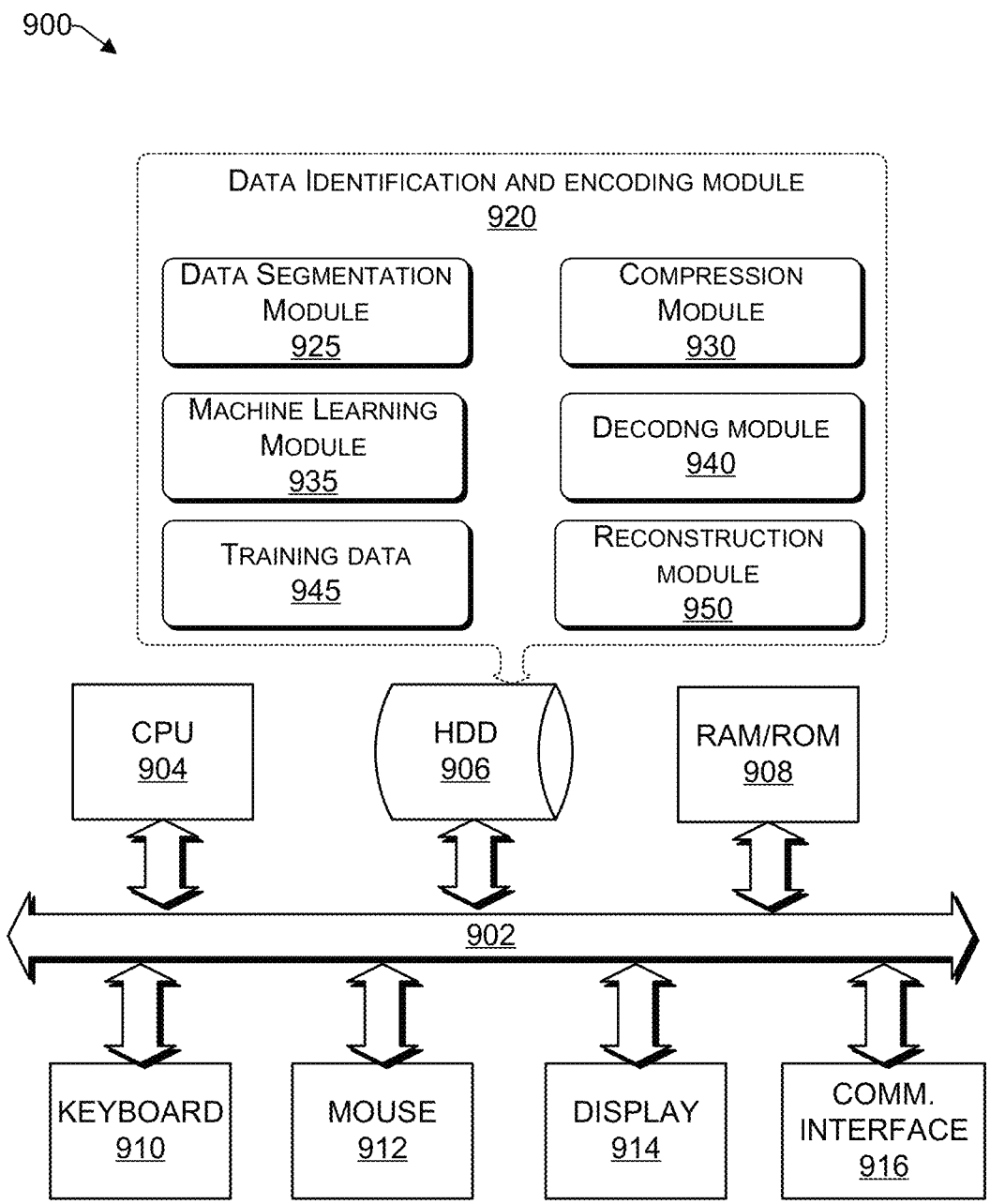
FIG. 9 is a functional block diagram illustration of a computer hardware platform that can communicate with agents in performing a collaborative task, consistent with an illustrative embodiment.

FIG. 9 provides a functional block diagram illustration 900 of a computer hardware platform. In particular, FIG. 9 illustrates a particularly configured network or host computer platform 900, as may be used to implement the methods shown in FIGS. 6, 7, and 8.

The computer platform 900 may include a central processing unit (CPU) 904, a hard disk drive (HDD) 906, random access memory (RAM) and/or read-only memory (ROM) 908, a keyboard 910, a mouse 912, a display 914, and a communication interface 916, which are connected to a system bus 902. The HDD 906 can include data stores.

In one embodiment, the HDD 906, has capabilities that include storing a program that can execute various processes, such as encoding module 920 for low-bandwidth transmission, as discussed in a manner described herein above, and is configured to manage the overall process.

The data segmentation module 925 is configured to segment identified salient and non-salient data in high-resolution videos. The data segmentation module can include a machine learning model, such as a General Adversarial Network (GAN) machine learning model.

The compression module 930 compresses the identified non-salient data for transmission with the salient data. The salient data may remain in its high resolution form, and both the salient and non-salient data can be transmitted together to one or more users. The compression of the non-salient data reduces the resolution of the non-salient data to a lower resolution. As it is often that there is significantly more non-salient data than salient data, compressing only the non-salient data reduces the size of the video data so that a low bandwidth transmission can occur. However, the salient data may also be compressed by the compression module 930 to the same compression ratio or a lower compression ratio than the non-salient data.

The machine learning model (MLM) module 935 is configured to identify one or more of salient data and non-salient data. While the present disclosure is applicable to machine learning modules of various types, as discussed herein above, a General Adversarial Network (GAN) machine learning model is used, consistent with an illustrative embodiment. The training of the MLM module 935 can be performed with training data 945 of previously recorded scenes in which there is non-salient data similar to a video stream. For example, in the streaming of live sporting events, previous images of crowds at soccer matches, basketball games, tennis matches can be used to train the machine learning model. For example, at a tennis match, the salient data would be at least the two players and their rackets, the tennis ball, and possibly the net. The remainder can be non-salient data that can be compressed to a lower resolution for transmission in a low bandwidth transmission. It is to be understood that other types of machine learning, such as deep learning, can also be used to reconstruct received streams of images back to high resolution at a user end.

The decoding 940 is configured to decode the video stream into the non-salient data in a lower-resolution format and the salient data in the higher-resolution format The reconstruction module 945 is configured to reconstruct the non-salient data to the higher resolution format of the salient data, and to combine the salient data and the reconstructed non-salient data to form a video stream in the higher-resolution format of the salient data. Machine learning is used in an illustrative embodiment to reconstruct the non-salient data into the higher resolution of the salient data and combine the reconstructed non-salient data with the salient data. In the case of multiple camera views, multiple transmissions of the salient data and the non-salient data are received for each respective viewpoint. After decoding, the reconstruction module 945 reconstructs a particular viewpoint or viewpoints for display. The construction of a particular viewpoint may be performed in response to a selection. The viewpoints may not be displayed upon reconstruction, and may be stored for future selection.

Example Cloud Platform

As discussed above, functions relating to the low bandwidth transmission of high definition video data may include a cloud. It is to be understood that although this disclosure includes a detailed description of cloud computing as discussed herein below, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 10:
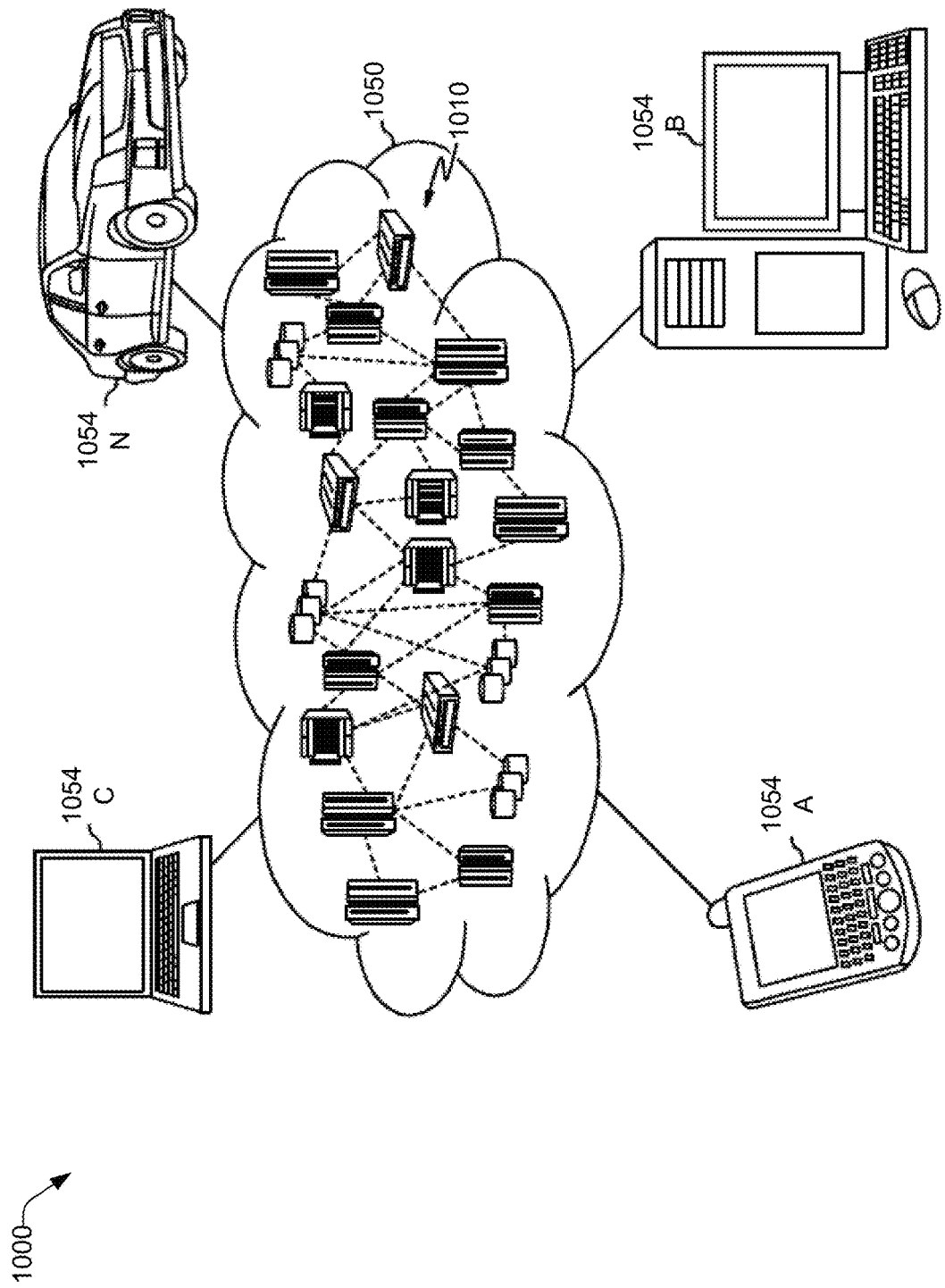
FIG. 10 depicts an illustrative cloud computing environment, consistent with an illustrative embodiment.

Referring now to FIG. 10, an illustrative cloud computing environment 1000 utilizing cloud computing is depicted. As shown, cloud computing environment 1000 includes cloud 1050 having one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms, and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
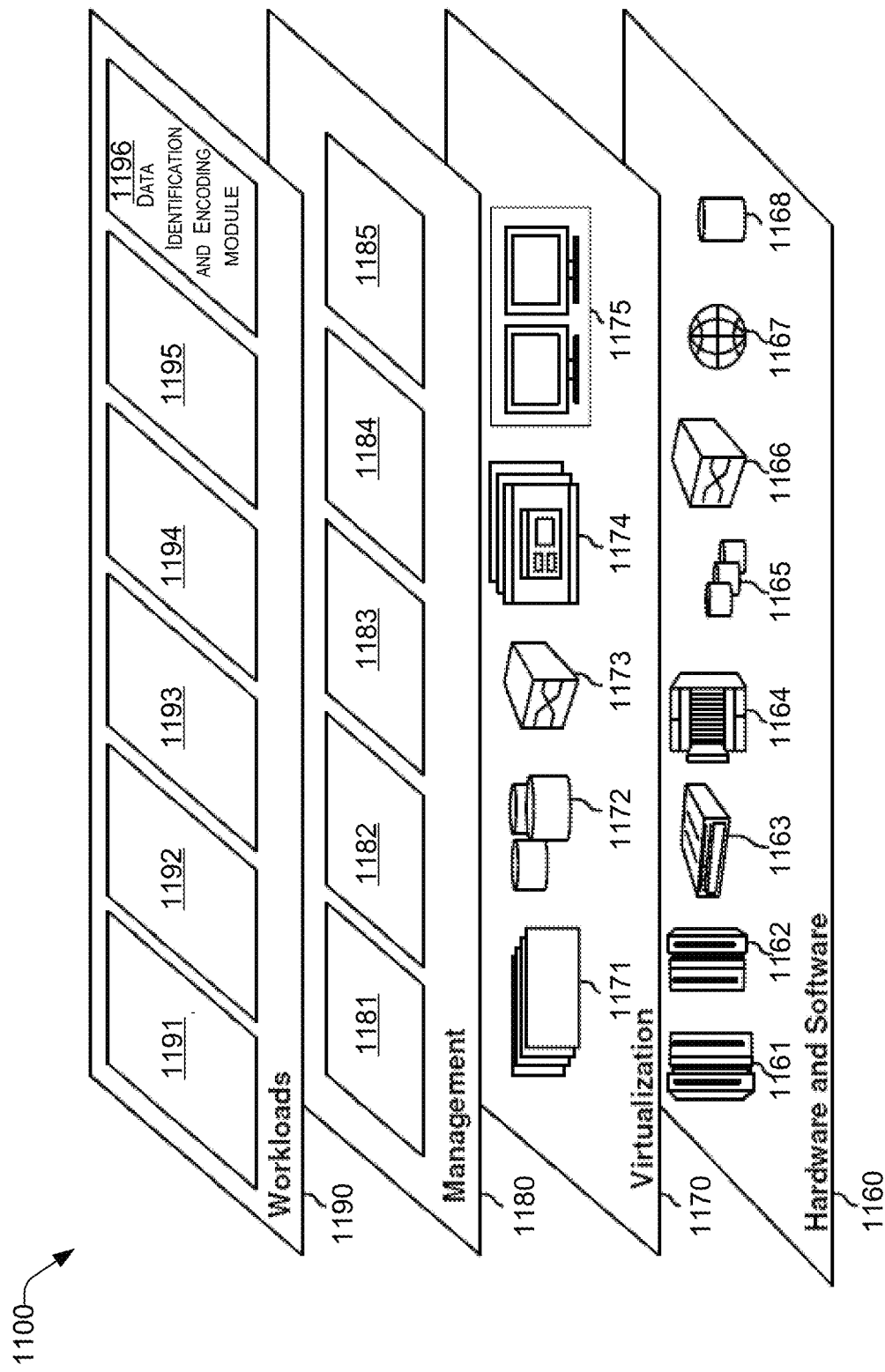
FIG. 11 depicts a set of functional abstraction layers provided by a cloud computing environment, consistent with an illustrative embodiment.

Referring now to FIG. 11 a set of functional abstraction layers 1100 provided by cloud computing environment 1000 (FIG. 10) is shown. It should be understood in advance that the components, layers, and functions shown in FIG. 11 are intended to be illustrative only and embodiments of the disclosure are not limited thereto. As depicted, the following layers and corresponding functions are provided:

Hardware and software layer 1160 include hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and a data identification and encoding module 1196 configured to identify salient and non-salient data, and to encode high-resolution video for low bandwidth transmission as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of decoding video data in multiple resolution formats, the computer-implemented method comprising:
   receiving an encoded video stream including a salient data and a non-salient data, the salient data having a higher resolution format than the non-salient data;
   receiving one or more of a link to access operation of, or load executable code for, a Generative Adversarial Network (GAN) machine learning model trained to identify non-salient features based on previously recorded video streams;
   decoding the video stream into the non-salient data in a lower-resolution format and the salient data in the higher resolution format;
   reconstructing the non-salient data to a higher resolution format using the GAN machine learning model; and
   combining the salient data and the reconstructed non-salient data to form a video stream in the higher-resolution format of the salient data.

2. The computer-implemented method of claim 1, wherein the received video stream includes a salient data and a non-salient data captured from multiple viewpoints; the computer-implemented method further comprising:
   training the GAN machine learning model to identify the salient data based on the multiple viewpoints; and
   reconstructing the non-salient data to the higher resolution of the salient data using the GAN machine learning model trained on the multiple viewpoints.

3. The computer-implemented method of claim 2, further comprising:
   receiving multiple transmissions of the salient data and the non-salient data for each viewpoint, respectively; and
   reconstructing a particular viewpoint for display in response to a selection.

4. The computer-implemented method of claim 3, further comprising:
   sharing location information with one or more registered users; and
   receiving selectable views of the salient data and the non-salient data captured by the one or more registered users.

5. The computer-implemented method of claim 1, wherein the higher resolution format is of a same resolution of that of the salient data.

6. The computer-implemented method of claim 1, wherein the salient data is received compressed at a lower compression ratio than the non-salient data.

7. The computer-implemented method of claim 1, further comprising receiving a plurality of video streams, each video stream having respectively different views of one or more objects.

8. The computer-implemented method of claim 1, wherein a compression of the non-salient data is based on the receiving of the video stream using a low-bandwidth transmission.

9. The computer-implemented method of claim 1, wherein salient data is based on one or more domain-specific characteristics of objects in the video stream.

* * * * *